(12) United States Patent
Hasebe et al.

(10) Patent No.: US 6,946,991 B2
(45) Date of Patent: Sep. 20, 2005

(54) PORTABLE TERMINAL

(75) Inventors: Kiyoshi Hasebe, Inasa-gun (JP);
Takashi Inagaki, Hamana-gun (JP);
Masahiro Mukojima, Fukuroi (JP);
Noriaki Kono, Hamakita (JP);
Toshifumi Fujimura, Hamamatsu (JP);
Satoshi Nihashi, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 10/290,912

(22) Filed: Nov. 8, 2002

(65) Prior Publication Data

US 2003/0103002 A1 Jun. 5, 2003

(30) Foreign Application Priority Data

| | | |
|---|---|---|
| Nov. 8, 2001 | (JP) | 2001-343807 |
| Oct. 1, 2002 | (JP) | 2002-288859 |

(51) Int. Cl.[7] ............................................... G01S 5/14
(52) U.S. Cl. .......................... 342/357.08; 342/357.13
(58) Field of Search ...................... 342/357.08, 357.13, 342/419; 701/213

(56) References Cited

U.S. PATENT DOCUMENTS

| | | | | |
|---|---|---|---|---|
| 5,146,231 | A | * 9/1992 | Ghaem et al. | ............... 342/419 |
| 5,790,477 | A | * 8/1998 | Hauke | .......................... 368/10 |
| 6,202,035 | B1 | 3/2001 | Lameer | |
| 6,580,999 | B2 | * 6/2003 | Maruyama et al. | ......... 701/200 |
| 6,633,813 | B1 | * 10/2003 | Deworetzki | ................. 701/209 |

FOREIGN PATENT DOCUMENTS

| | | | |
|---|---|---|---|
| EP | 0 165 381 | 12/1985 | |
| EP | 861416 B1 | * 4/2000 | ........... G01C/21/20 |
| JP | 7-43670 | 10/1995 | |
| JP | 07-280582 | 10/1995 | |
| JP | H09-043334 | 2/1997 | |
| JP | 2001-264101 | 9/2001 | |
| WO | WO 82/03132 A1 | * 9/1982 | ............. G04C/9/00 |
| WO | WO 85/01805 A1 | * 4/1985 | ........... G04B/19/26 |
| WO | WO 98/43044 A1 | * 10/1998 | ........... G01C/17/02 |
| WO | WO 00/62131 A1 | * 10/2000 | ........... G04B/47/06 |

OTHER PUBLICATIONS

Ahmadiyya Muslim Community, "Types of Prayers and Number of Rak'ats," Oct. 28, 2002, 5 pages.
People's Republic of China State Intellectual Property Office, "First Office Action," p. 1–6, ( Jan. 7, 2005).
Korea Patent Office Notice for Reason for Rejection, Dated Apr. 25, 2005.

* cited by examiner

*Primary Examiner*—Gregory C. Issing
(74) *Attorney, Agent, or Firm*—Pillsbury Winthrop Shaw Pittman LLP

(57) ABSTRACT

A portable terminal (e.g., portable telephone) is constituted using a geomagnetic sensor for detecting an azimuth, and a GPS receiver for detecting a present position thereof. A direction of a prescribed place (e.g., Mecca) is calculated based on the azimuth information and position information, so that the calculated direction is indicated by an arrow displayed on the screen of a display. In addition, a prescribed message is displayed on the screen of the display, or it is produced as preset vocalized sounds by a speaker. The azimuth information and position information are automatically produced at each religious service time, at which a user, especially a muslim who pray, holds a religious service in the direction of Mecca. In addition, the portable terminal can detect a direction match between the direction designated by the prescribed portion (e.g., antenna) of the portable terminal body and the direction of Mecca.

8 Claims, 8 Drawing Sheets

PORTABLE TERMINAL

BACKGROUND OF THE INVENTION

1. Field of the Invention

This invention relates to portable terminals such as portable telephones having displays.

2. Description of the Related Art

Recently, portable telephones such as cellphones and PHS (Personal Handyphone System) devices are widely spread in the market, and the number of users has correspondingly increased rapidly, wherein they are improved in various functions, which are newly designed and provided therefor. As the number of users increases, a variety of needs are created; therefore, it becomes necessary to further improve portable telephones in availability and usability.

Various technologies have been developed and disclosed in various papers such as Japanese Unexamined Patent Publication No. 2001-264101 and Japanese Examined Utility-Model Publication No. Hei 7-43670, wherein GPS (Global Positioning System) functions are provided in portable telephones to detect present positions thereof.

The aforementioned additional functions provided in portable telephones may improve portable telephones in usability; however, they may not be used very frequently compared with the existing telephone functions. Several potable telephones provide functions of detecting positional information using GPS and functions of taking pictures using digital cameras, which may not be normally used by users thereof. This raises a problem in that these additional functions may be useless for some users of portable telephones.

SUMMARY OF THE INVENTION

It is an object of the invention to provide a portable terminal that provides additional functions, which are usable for the user and which can be used more frequently compared with simple GPS functions and digital camera functions.

A portable terminal (e.g., portable telephone) of this invention is constituted using a geomagnetic sensor for detecting an azimuth, and a GPS receiver for detecting a present position thereof. A direction towards a prescribed place (e.g., Mecca) is calculated based on the azimuth information and position information, so that the calculated direction is indicated by an arrow displayed on the screen of a display. In addition, a prescribed message is displayed on the screen of the display, or it is produced as preset vocalized sounds by a speaker. The azimuth information and position information are automatically produced at each religious service time, at which the user especially a muslim who wishes to pray, holds a religious service in the direction of Mecca.

Relationships between regional locations and religious service times are described in the form of religious service time tables, which are stored in advance in the memory of the portable terminal or which can be downloaded from a specific server via networks. Religious service times are determined based on the position information and date information (e.g., calendar data), and they may be automatically corrected by inputting the present date.

The portable telephone can be set to either a telephone precedence mode or a religious service precedence mode, which is selected by the user operating a prescribed mode switchover key. When the religious service mode is selected, the portable telephone inactivates transmission and reception of signals for the prescribed time period counted from the religious service time.

In addition, the portable terminal can be used as a direction detector for allowing the user to search for the prescribed direction. That is, when the user holds the portable terminal and moves it in a clockwise or counterclockwise direction, the antenna attached to the upper portion of the portable terminal body is correspondingly moved. When there is a match between the direction designated by the antenna and the prescribed direction, the portable terminal automatically produces a message describing the direction match.

Thus, the user especially a muslim who wishes to pray can reliably hold religious services in the direction towards Mecca accurately at the prescribed religious service times at any location on earth.

BRIEF DESCRIPTION OF THE DRAWINGS

These and other objects, aspects, and embodiments of the present invention will be described in more detail with reference to the following drawings, in which.

DESCRIPTION OF THE PREFERRED EMBODIMENTS

This invention will be described in further detail by way of examples with reference to the accompanying drawings.

Figure 1:
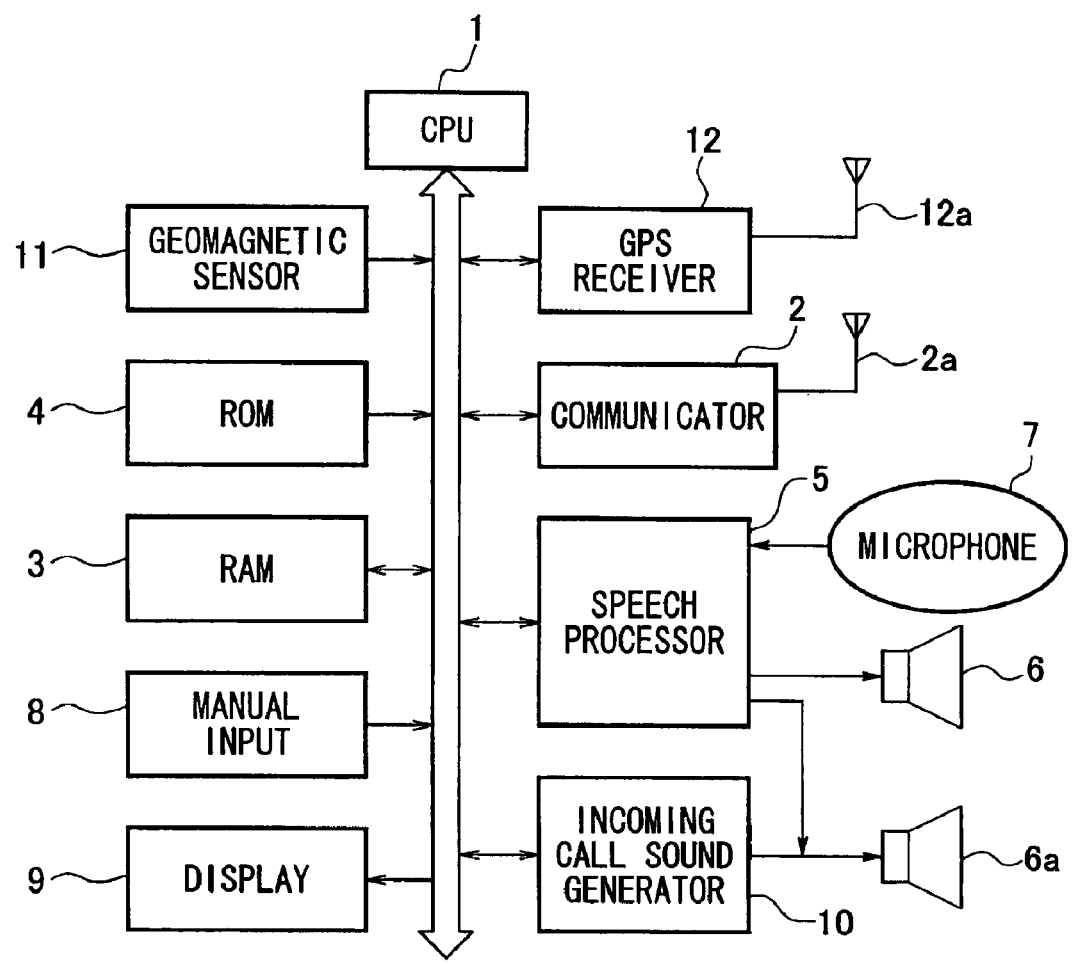
FIG. 1 is a block diagram showing the overall configuration of a portable telephone in accordance with the preferred embodiment of the invention.

FIG. 1 is a block diagram showing the overall configuration of a portable terminal (i.e., a portable telephone) in accordance with the preferred embodiment of the invention. Reference numeral 1 designates a CPU that normally executes telephone control programs to control various blocks and sections of the portable terminal. Incidentally, the portable terminal is not necessarily limited to the portable telephone; hence, it is possible to include a PHS device, a PDA (Personal Digital Assistant) device, and the like.

A communicator 2 having an antenna 2a performs modulation of transmitting signals and demodulation of received signals. A random-access memory (RAM) 3 is used to read and write data, specifically, it stores user setup data and the like. A read-only memory (ROM) 4 stores various telephone control programs regarding transmission of signals and reception of incoming calls, which are executed by the CPU 1. The communicator 2 performs transmission of outgoing call signals and reception of incoming call signals, as well as transmission and reception of character information such as electronic mails (or e-mails) via the antenna 2a.

A speech processor 5 converts received data, which the communicator 2 produces by demodulating signals received via antenna 2a, to analog speech signals, which are output to a speaker 6. In addition, the speech processor 5 performs compressive coding on speech signals, which are picked up by an microphone 7. The communicator 2 transmits corresponding speech data via the antenna 2a. Further, the speech processor 5 has a capability of providing a speaker 6a with pre-recorded sound data representing the music, announcement, and vocalized messages such as Koranic words, which are stored in a message memory 16 shown in FIG. 2.

Figure 3:
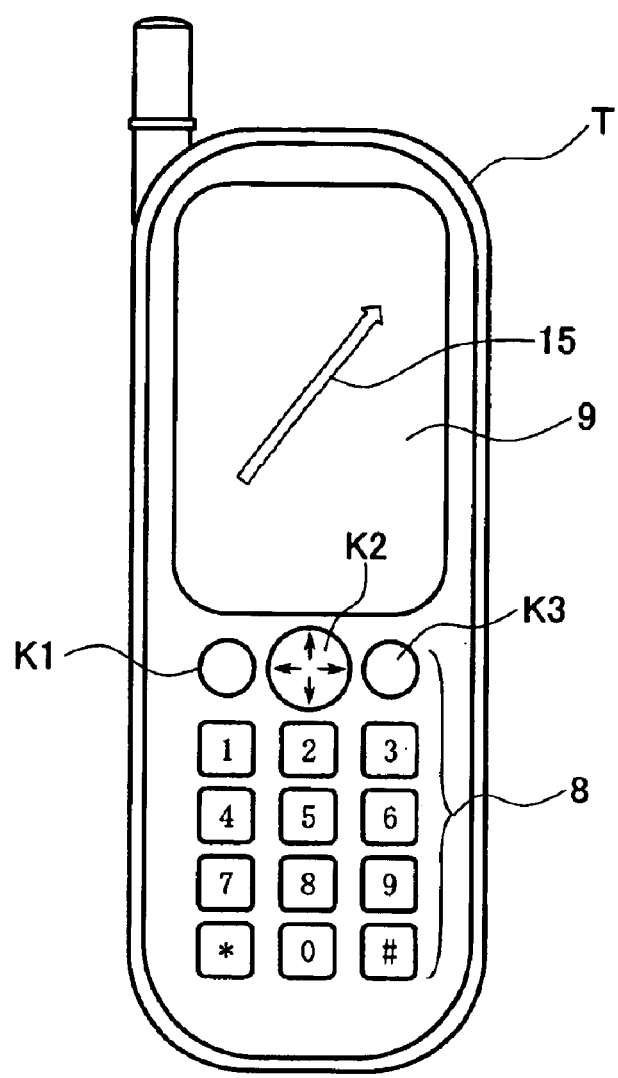
FIG. 3 is a plan view showing an exterior appearance of the portable telephone.

An operator's manual input section 8 is constituted by numeric keys representing numbers of '0' to '9', and function keys K1, K2, and K3 (see FIG. 3). This allows the user to manually input telephone numbers and to manually designate various functions. A display (e.g., a small-size liquid crystal display) 9 displays a telephone function menu, and various data such as characters in response to user's manual operations of numeric keys and function keys in the manual operation input section 8.

An incoming call sound generator 10 proceeds to generate incoming call sounds on the speaker 6a upon reception of control signals regarding incoming calls via the communicator 2. Reference numeral 11 designates a geomagnetic sensor, and reference numeral 12 designates a GPS receiver.

The portable telephone of the present embodiment is characterized by providing a brand-new function for indicating the prescribed direction (e.g., Mecca) in addition to the existing normal portable telephone functions. Therefore, this portable telephone is available for use especially in Islamic religious services. Normally, muslims who pray hold Islamic religious services ('Salat') five times every day. Specifically, in the case of Jul. 1, 2002, in Tokyo, Islamic religious service times are 2:40 a.m. (dawn service: 'Fajr'), 11:45 a.m. (noon service: 'Zhuhr'), 3:34 p.m. (afternoon service: 'Asr'), 7:01 p.m. (sunset service: 'Maghrib'), and 8:49 p.m. (nightfall service: 'Isha'). These services should be held in the direction of Mecca. Therefore, the portable telephones such as cellphones, which are widely spread in the market and in the world, can be effectively used by muslims who pray and are improved in usability and availability because they can display directions (or arrows) showing the prescribed direction(s) at the prescribed time(s).

Figure 2:
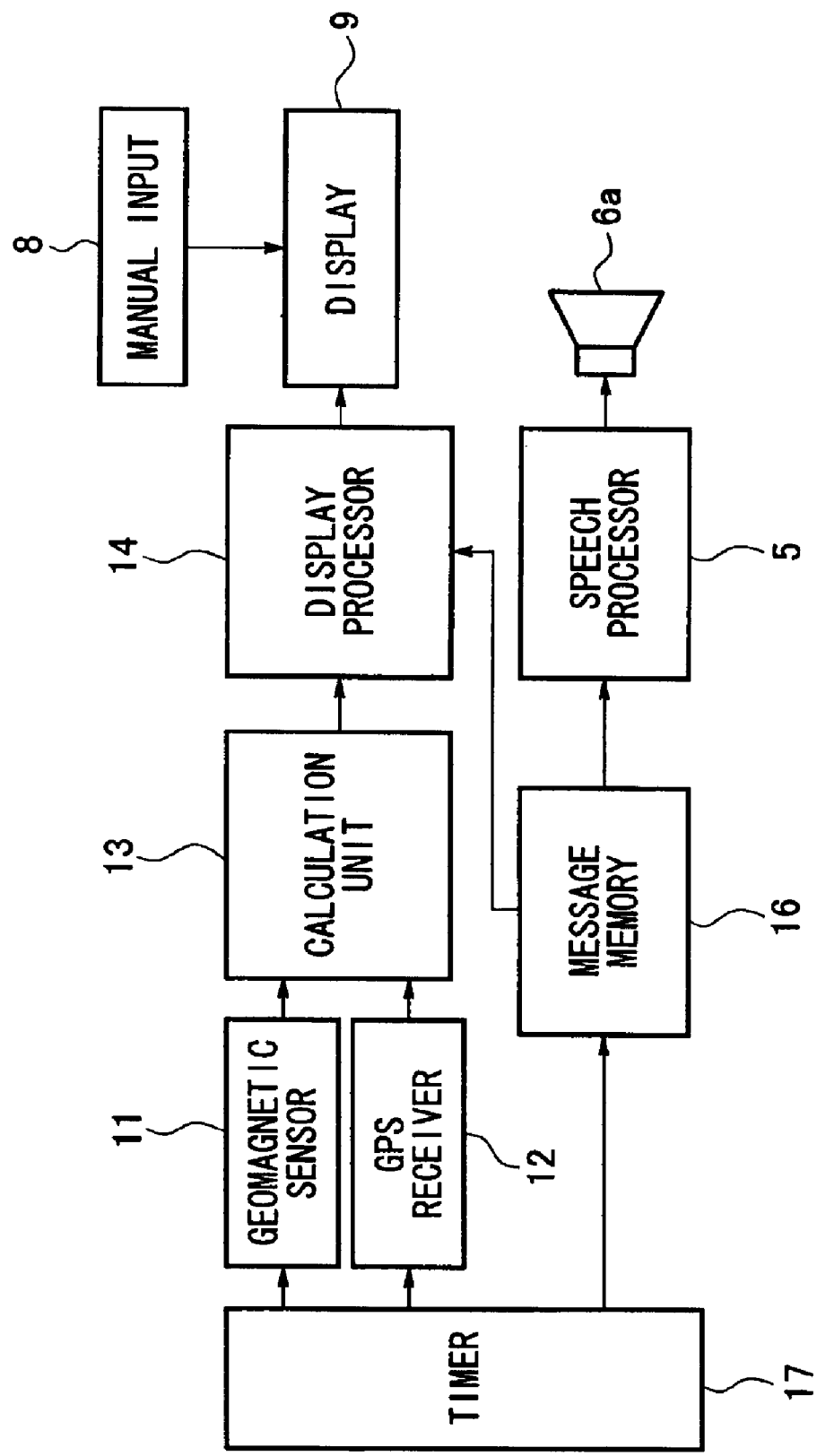
FIG. 2 is a block diagram showing selected functional blocks for use in the portable telephone, which is used to indicate a prescribed direction for a prescribed user holding religious services.

FIG. 2 shows selected functional blocks of the portable telephone that is used for the prescribed user holding religious services. That is, the portable telephone additionally provides a geomagnetic sensor (or an azimuth detector) 11, which detects geomagnetism to produce azimuth information. The azimuth information is supplied to a calculation unit 13 arranged inside of the CPU 11. In addition, the portable telephone provides a GPS receiver (or a position detector) 12, which receives electromagnetic waves and signals from GPS satellites (not shown) via a GPS antenna 12a (see FIG. 1) and send position information to the calculation unit 13. Both the geomagnetic sensor 11 and the GPS receiver 12 are now known well.

Based on the azimuth information from the geomagnetic sensor 11 and the position information from the GPS receiver 12, the calculation unit 13 performs prescribed calculations to determine the direction of Mecca. The present position information is stored in the RAM 3. Specifically, the calculation unit 13 calculates the north direction based on the azimuth information from the geomagnetic sensor 11 as the reference azimuth, based on which an azimuthal angle is calculated with respect to the direction of Mecca. Calculation results of the calculation unit 13 are forwarded to a display processor 14, which in turn controls the display 9 to indicate the objective direction of Mecca on the screen. FIG. 3 shows an example of an image displayed on the screen of the display 9. That is, the display processor 14 processes calculation results of the calculation unit 13 to create an image of an arrow 15 directing towards Mecca on the screen of the display 9. Incidentally, the prescribed position information of Mecca (i.e., latitude 21:21:00, longitude 039:48:00) is stored in the ROM 4 in advance.

Figure 4:
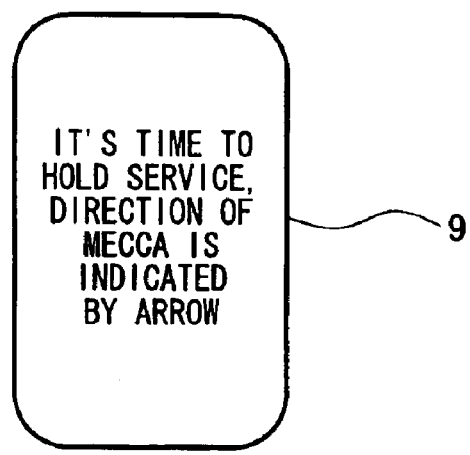
FIG. 4 shows an example of a message displayed on the screen of a display of the portable telephone.

Reference numeral 16 designates a message memory that is arranged inside of the ROM 4. The message memory 16 is exclusively used to describe prescribed messages in vocalized sounds and characters, an example of which is as follows:

"It is time to hold a service, and the direction of Mecca is indicated by the arrow." The vocalized sound information (or sound data) is supplied to the speech processor 5, by which corresponding vocalized sounds can be produced by the speaker 6a. In addition, the character information is supplied to the display processor 14, by which corresponding characters can be displayed on the screen of the display 9. FIG. 4 shows the aforementioned example of the message displayed on the screen of the display 9.

Reference numeral 17 designates a timer, which outputs start signals to the geomagnetic sensor 11 and the GPS receiver 12 respectively at each of the prescribed times (e.g., in the case of Jul. 1, 2002, in Tokyo, 4:35 a.m., 1:48 p.m., 5:49 p.m., 9:13 p.m., and 10:43 p.m.), and which also urges the message memory 16 to output vocalized sound information (or sound data) and character information. This timer 17 is realized by functions of a system clock.

At the religious service time, the geomagnetic sensor 11 and the GPS receiver 12 are both activated by signals output from the timer 17. In addition, the vocalized sound information (or sound data) is read from the message memory 16 and is supplied to the speaker 6a via the speech processor 5. Further, the character information is read from the message memory 16 and is supplied to the display 9 via the display processor 14.

The operator's manual input section 8 arranges the aforementioned numeric keys and function keys (i.e., K1, K2, and K3 shown in FIG. 3), wherein the function key K2 acts as a mode switchover key. By operating the mode switchover key K2, the user is able to switch over the mode between the telephone precedence mode and religious service precedence mode. When the religious service precedence mode is selected, the portable telephone temporarily stops telephone functions, transmission and reception of control signals regarding incoming calls and outgoing calls, as well as transmission and reception of speech signals, which are subjected to compressive coding. On the other hand, when the telephone precedence mode is selected, the portable telephone stops prescribed functions regarding religious services. Alternatively, it is possible to temporarily stop transmission and reception of character information such as e-mails. It is possible to allocate functions of allowing and disallowing telephone interrupts during the religious service precedence mode to the function keys K1 and K3.

Figure 5:
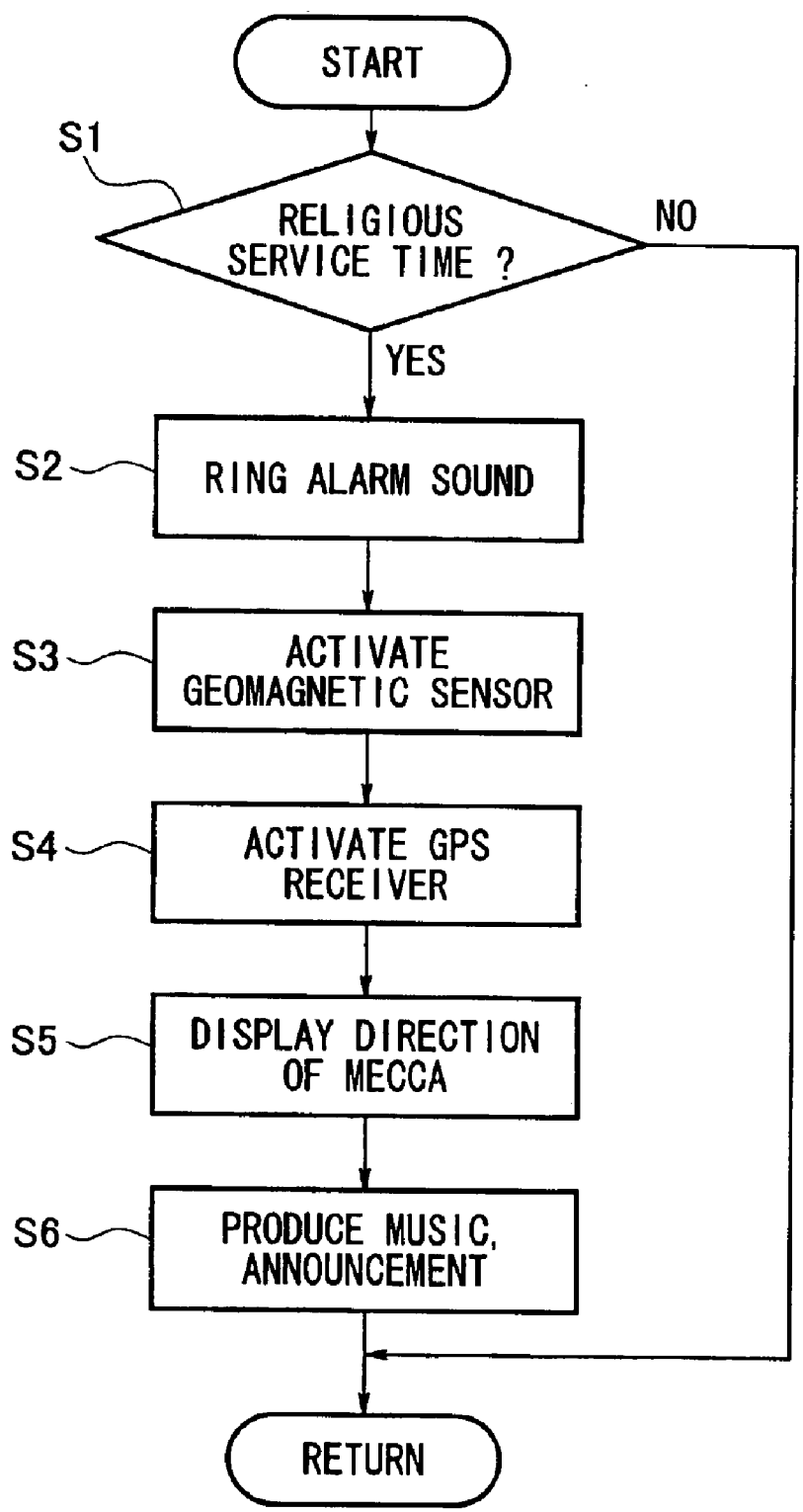
FIG. 5 is a flowchart showing a religious service time notification process.

FIG. 5 is a flowchart showing a religious service time notification process in which the portable telephone notifies the user of a religious service time.

First, the user operates the mode switchover key K2 of the portable telephone to select either the telephone precedence mode or the religious service precedence mode. In addition, the user operates the function keys K1 or K3 to make a setup for allowing or disallowing a telephone interrupt during the religious service precedence mode. When it comes to the specific time (i.e., religious service time) in the religious service precedence mode, the CPU 1 inactivates the communicator 2 not to perform transmission and reception (or reception only) of speech signals, which are subjected to compressive coding, until the prescribed time period that the user requires to hold a religious service completely elapses from the religious service time.

Thus, it is possible to establish the religious service precedence mode in which communication functions such as conversations and e-mails are inactivated during the prescribed time period elapsed from the religious service time, so that the user holding a religious service is not interrupted by transmission and reception of signals.

In step S1, a decision is made as to whether or not a religious service time has arrived. Specifically, a decision is made as to whether or not the time counted by the system clock matches the prescribed religious service time that is stored in the ROM 4 in advance. If 'NO', the religious service time notification process is started again, so that the aforementioned decision step S1 is repeated again. If 'YES', the flow proceeds to step S2.

In step S2, the CPU 1 controls the speaker 6a to ring an alarm sound. In addition, it controls the display 9 to display the aforementioned message shown in FIG. 4 on the screen. That is, the user is reliably notified of the religious service time by the portable telephone, which produces the alarm sound while displaying the message on the screen.

In step S3, the CPU 1 activates the geomagnetic sensor 11, output signals of which are then supplied to the calculation unit 13. Then, the flow proceeds to step S4.

In step S4, the CPU 1 activates the GPS receiver 12, output signals of which are then supplied to the calculation unit 13. Then, the flow proceeds to step S5.

In step S5, the CPU 1 controls the display 9 to display an arrow 15 representing the direction of Mecca on the screen (see FIG. 3). This allows the user at any terrestrial position to confirm the direction of Mecca by the arrow 15 displayed In step S6, the portable telephone produces the specific music and announcement regarding the religious service. Thereafter, the religious service time notification process is ended or started again. Thus, the user is able to solemnly hold a religious service while directing his/her head towards Mecca. It is possible to reproduce Koranic words instead of the prescribed announcement on the portable telephone.

The aforementioned step S6 can be modified so as to automatically call friends of muslims who are extracted from an address book stored in the portable telephone, and to notify them of the religious service time. Herein, the portable telephone automatically calls telephones of such friends of muslims, or it automatically transmits e-mails to them.

In the aforementioned embodiment, the GPS receiver 12 is automatically activated to detect the present terrestrial position of the portable telephone at the religious service time, while the geomagnetic sensor 11 is also activated to detect the azimuth representing the present direction of the portable telephone. Then, the CPU 1 performs calculations to determine the direction of Mecca with respect to the present position of the portable telephone, and the display processor 14 correspondingly controls the display 9 to display an arrow 15 on the screen. Thus, the user of the portable telephone is able to reliably and accurately determine the direction of Mecca.

When displaying the arrow 15 indicating the direction of Mecca on the screen, the display 9 also displays the prescribed message (see FIG. 4) on the screen under the control of the display processor 14, which rouses the user of the religious service time. In addition, the portable telephone produces the prescribed music and/or announcement on the speaker 6a at the religious service time. This assists the user to reliably hold a religious service with the portable telephone. Thus, the user is able to hold a religious service without problems.

As described above, when a religious service time arrives, the portable telephone automatically displays an arrow 15 indicating the direction of Mecca on the screen of the display 9, while it also produces vocalized sounds representing a prescribed message on the speaker 6a. This makes the user to timely and accurately determine his/her position and the direction of Mecca, so that the user is able to recognize the religious service time. In addition, the portable telephone is capable of assisting the user to hold a religious service by timely producing the prescribed music and/or announcement on the speaker 6a. This may increase the use frequency of the portable telephone especially by the specific user such as the Islamic prayer, which may contribute to improvement of usability of the portable telephone.

Next, a Mecca direction display mode of the portable telephone will be described with reference to FIG. 8, wherein the user manually operates keys to instruct the portable telephone to display the direction of Mecca on the screen of the display 9.

The portable telephone of the present embodiment provides two modes, i.e., the religious service precedence mode and telephone precedence mode, each of which allows the user to make a setup for the Mecca direction display mode by operating a specific key such as a mode switchover key K3 or a toggle switch key K2.

In step S30, a decision is made as to whether or not the user makes a Mecca direction display request. Specifically, a decision is made as to whether or not the Mecca direction display mode is set by the user; that is, a decision is made as to whether or not the mode switchover key K3 or K2 is operated by the user to select the Mecca direction display mode. If 'NO', the flow returns to step S30 again, so that the aforementioned decision is repeatedly performed. If 'YES', the flow proceeds to step S31.

In step S31, the CPU 1 activates the geomagnetic sensor 11, output signals of which are then supplied to the calculation unit 13. Then, the flow proceeds to step S32.

In step S32, the CPU 1 activates the GPS receiver 12, output signals of which are then supplied to the calculation unit 13. Then, the flow proceeds to step S33.

In step S33, the display processor 14 controls the display 9 based on calculation results of the calculation unit 13, thus displaying an arrow 15 indicating the direction of Mecca on the screen. That is, the user is able to acknowledge the direction of Mecca by the arrow 15 displayed on the screen by a simple manual operation on the portable telephone.

Figure 8:
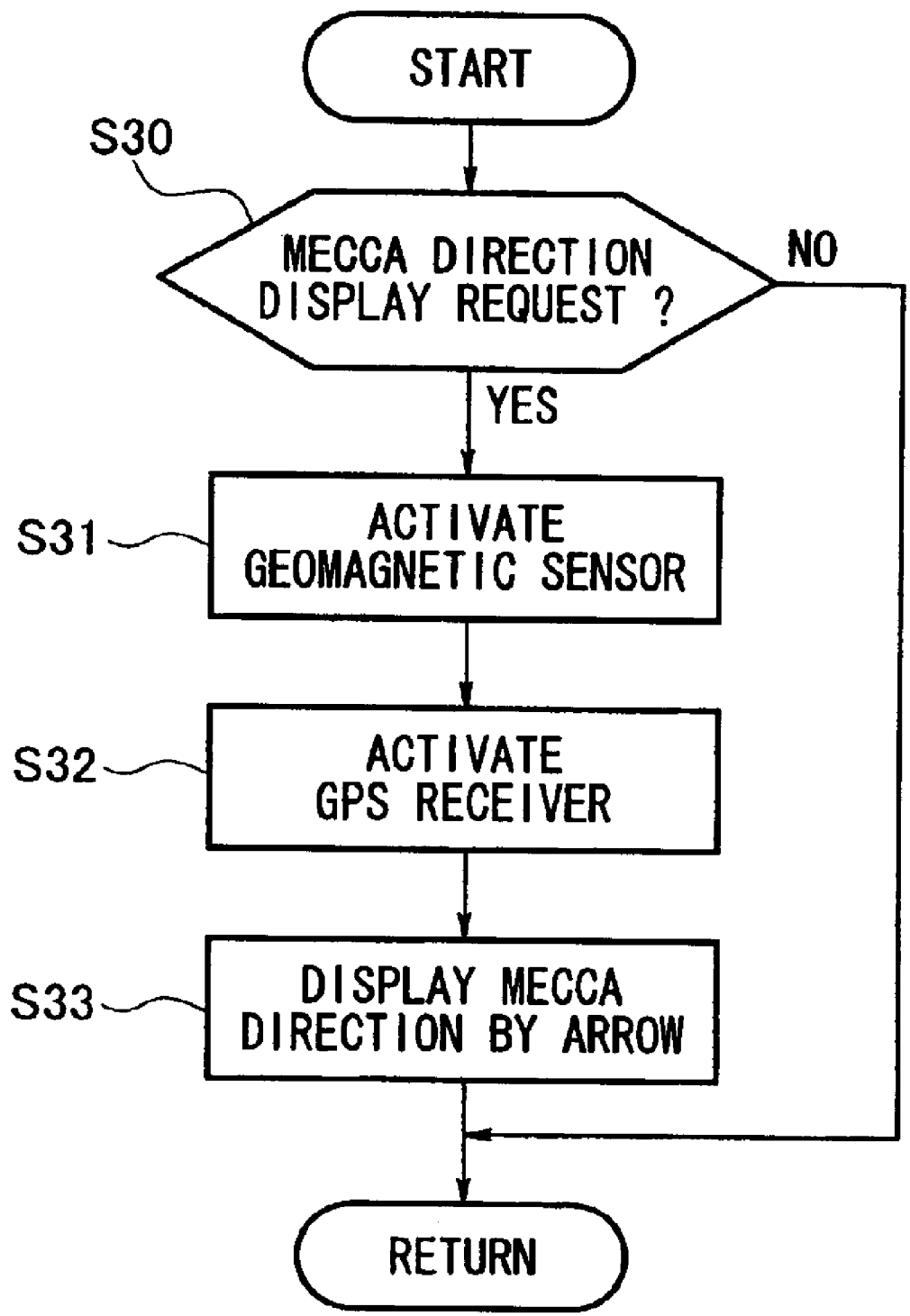
FIG. 8 is a flowchart showing a Mecca direction display process.
Figure 9:
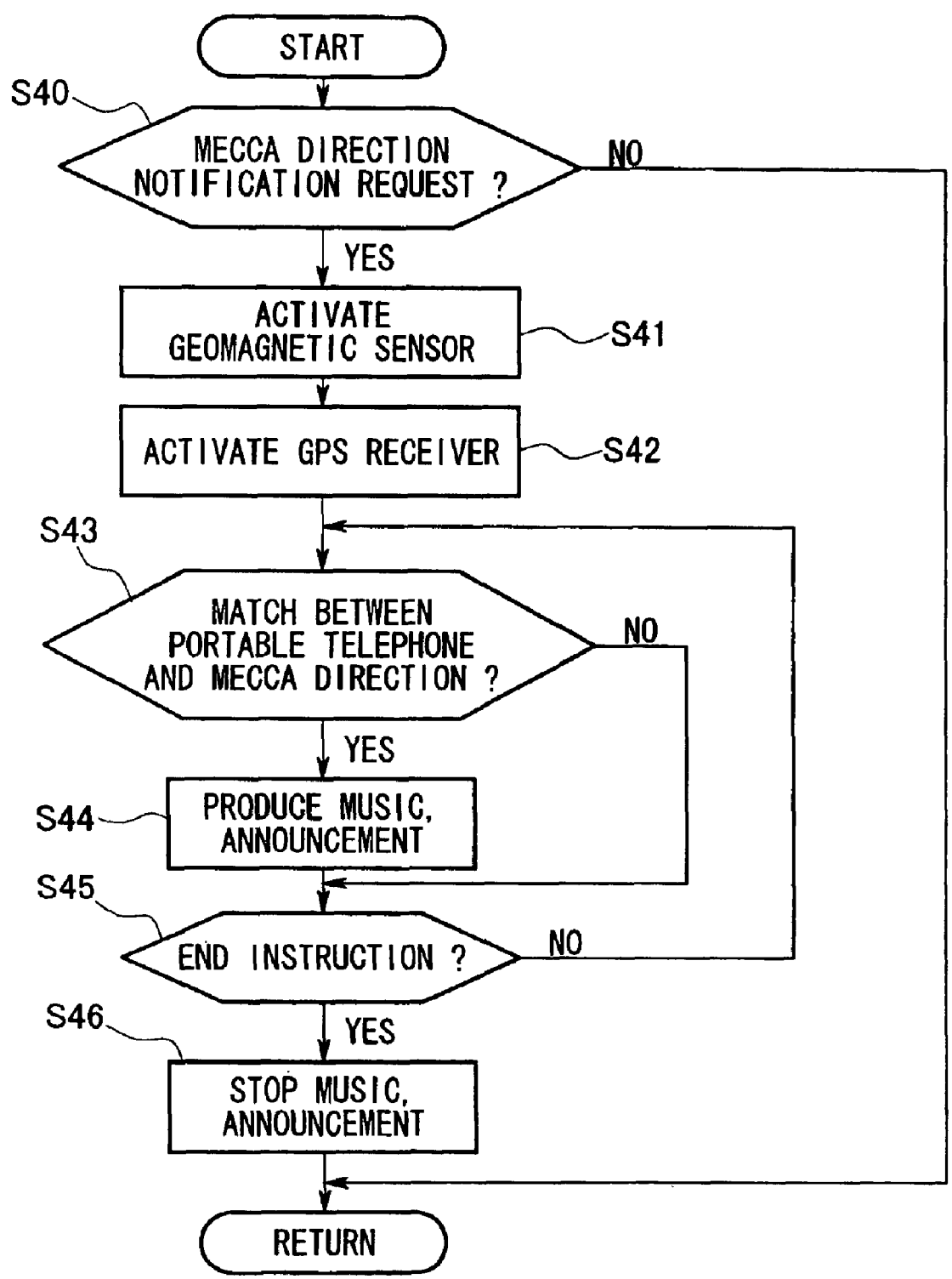
FIG. 9 is a flowchart showing a Mecca direction search process.

Therefore, the user simply turns on the mode switchover key K3 to set the portable telephone to the Mecca direction display mode and to start the Mecca direction display process of FIG. 8. That is, the user is able to easily set the portable telephone to function as a detector for detecting the direction of Mecca. If the user, such as a muslim who prays, holds religious services normally at the prescribed position, the user is required to simply execute this function once to detect the direction of Mecca. Thereafter, the user is no longer required to repeatedly execute the function on the portable telephone; that is, the user is merely required to sit and wait for religious service times notified by alarm sounds. Hence, the portable telephone of the present embodiment is convenient and usable for the prescribed user such as a muslim who prays.

Figure 6:
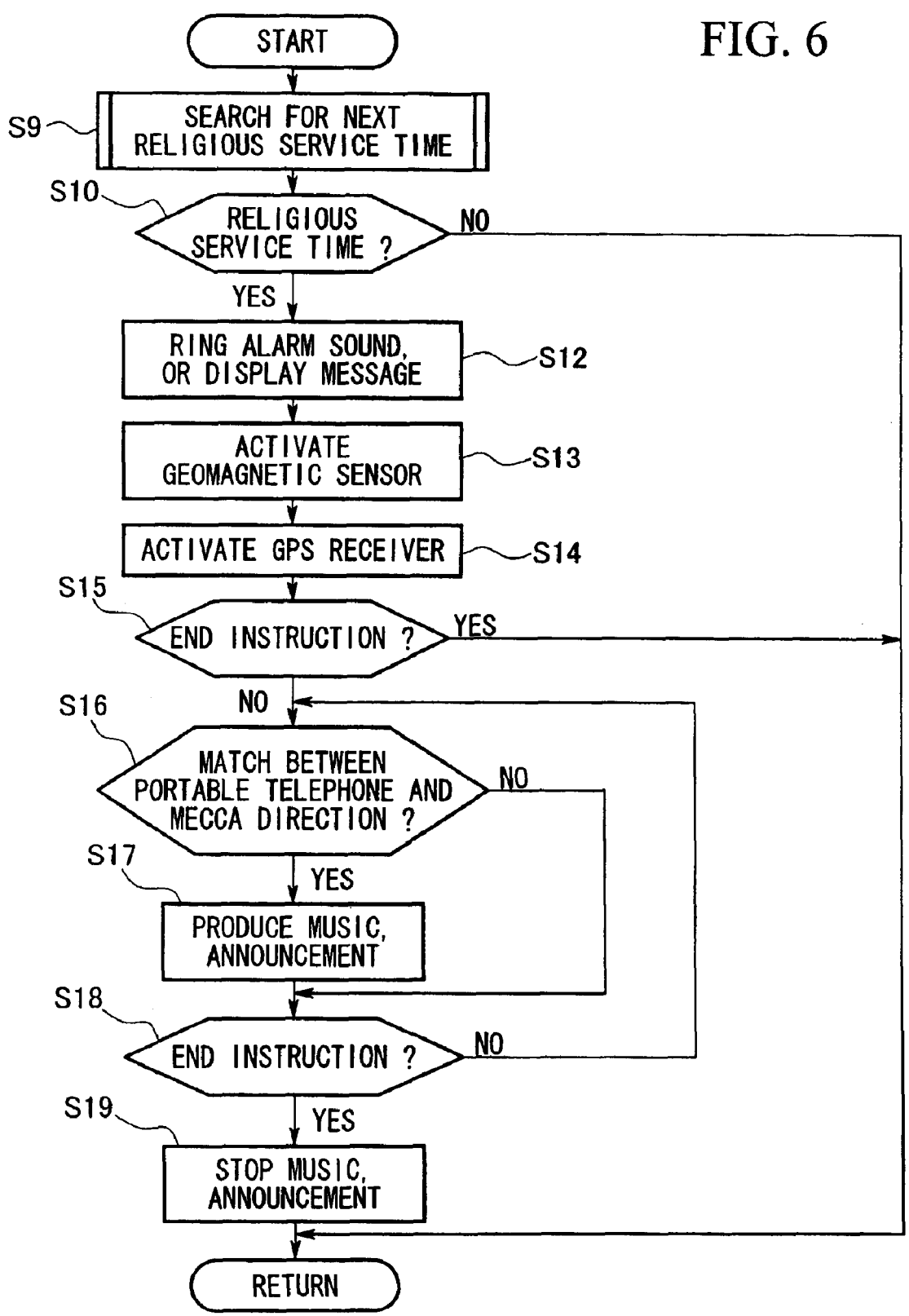
FIG. 6 is a flowchart showing a religious service notification process executed by a portable telephone of a second embodiment of the invention.
Figure 7:
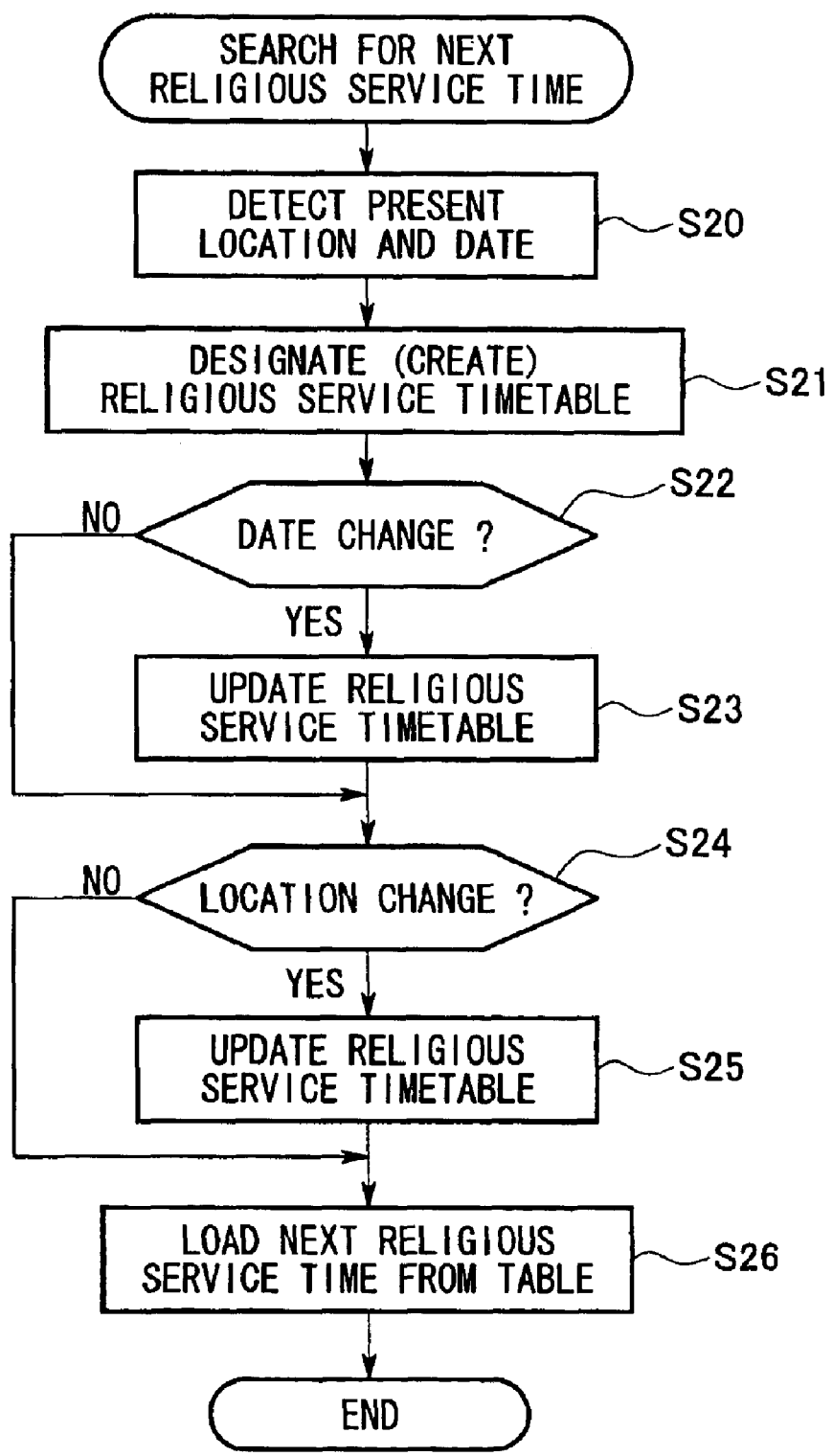
FIG. 7 is a flowchart showing a religious service time search process.

Next, a second embodiment of this invention will be described with reference to FIGS. 1 to 3 as well as FIGS. 6 and 7, wherein the second embodiment is substantially similar to the first embodiment in the exterior appearance and configuration of the portable telephone. Unlike the first embodiment, the portable telephone of the second embodiment is not designed to display the direction of Mecca by the arrow 15 (see FIG. 3) on the screen of the display 9. Instead, the second embodiment is designed in such a way that when the user holds the portable telephone body (or terminal body) T showing the screen of the display 9 upright and rotatably moves it in a clockwise or counterclockwise direction, the portable telephone automatically produces the prescribed music and/or announcement when the direction of the antenna 2a substantially matches the direction of Mecca, wherein the antenna 2a is attached at the upper portion of the portable telephone, which may be held horizontally by the user. Thus, the user is notified of the direction of Mecca when searching for the direction of Mecca by horizontally holding and rotatably moving the portable telephone in the clockwise or counterclockwise direction.

In addition, the portable telephone of the second embodiment is automatically set to the religious service precedence mode when it comes to a religious service time, wherein it is changed over to the telephone precedence mode when the user inputs an end instruction, which is realized by turning off the key K2. In the religious service precedence mode, when a specified time (i.e., a religious service time) arrives, the CPU 1 inactivates the communicator 2 so as not to perform transmission and reception of control signals regarding incoming calls and outgoing calls, and transmission and reception (or reception only) of speech signals, which are subjected to compressive coding, as well as transmission and reception of character information such as e-mails until the prescribed time required to hold a religious service completely elapses from the religious service time.

Thus, when it comes to the religious service time, the portable telephone is set to the religious service precedence mode that temporarily inactivates transmission and reception of signals for the prescribed time period counted from the religious service time. That is, the user's religious service is no longer interrupted by transmission and reception of signals on the portable telephone.

The portable telephone of the second embodiment performs a religious service notification process, which will be described with reference to FIG. 6.

In step S9, the CPU 1 searches for a next religious service time, which is retrieved from a religious service timetable, details of which will be described later. Then, the flow proceeds to step S10.

In step S10, a decision is made as to whether or not it comes to a religious service time. This decision is made by determining whether or not the system clock counts the prescribed time preset to the religious service timetable. If 'YES', that is, when the religious service time arrives, the flow proceeds to step S12. If 'NO', that is, when it is before the religious service time, the flow returns to step S9 again.

In step S12, the CPU 1 controls the speaker 6a to ring a prescribed alarm sound, or it controls the display 9 to display a prescribed message on the screen. For example, the display 9 displays on the screen the following message to rouse the user of the religious service time.

"It is time to hold a service, and please search for the direction of Mecca" The portable telephone can ring the alarm sound independently or in addition to the aforementioned message displayed on the screen, which may rouse the user of the religious service time more effectively. Incidentally, the sound information (or sound data) representing the alarm sound and the character information representing the message are stored in the message memory 16 in advance.

In step S13, the CPU 1 activates the geomagnetic sensor 11, output signals of which are then supplied to the calculation unit 13. Then, the flow proceeds to step S14.

In step S14, the CPU 1 activates the GPS receiver 12, output signals of which are then supplied to the calculation unit 13. Then, the flow proceeds to step S15.

In step S15, a decision is made as to whether or not the user operates the portable telephone to issue an end instruction. When the user intends to end a religious service, the user turns off the key K2 to issue an end instruction. In response to the end instruction, the portable telephone is set to the telephone precedence mode. If 'YES' in step S15, that is, when the user operates the portable telephone to issue an end instruction, the flow returns to step S9 again. If 'NO', that is, when an end instruction is not issued, the flow proceeds to step S16.

In step S16, a decision is made as to whether or not the direction designated by the portable telephone held by the user matches the prescribed direction of Mecca. This decision is made under the condition where the user holds the portable telephone to turn the screen of the display 9 upright and rotatably moves it in a clockwise or counterclockwise direction, so that the CPU 1 makes a determination whether or not the direction designated by the antenna 2a of the portable telephone substantially matches the direction of Mecca.

FIG. 3 merely shows an example in which the antenna 2a is attached to the upper portion of the portable telephone and can be retracted or extended therefrom. The aforementioned decision is not necessarily performed in response to the direction designated by the antenna 2a of the portable telephone. That is, the decision can be made using the other parts of the portable telephone such as the lower side of the portable telephone.

If 'YES' in step S16, that is, when the CPU 1 determines that the direction designated by the portable telephone substantially matches the direction of Mecca, the flow proceeds to step S17. If 'NO' so that the direction designated by the portable telephone does not match the direction of Mecca, the flow proceeds to step S18.

In step S17, the portable telephone automatically produces the prescribed music and/or announcement on the speaker 6a in order to notify the user of a 'match' event in which the direction designated by the portable telephone substantially matches the direction of Mecca. Then, the flow proceeds to step S18. In step S17, the portable telephone produces the following message in an announcement, for example.

"This is the direction of Mecca." Instead, it is possible to produce vocalized sounds representing Koranic words together with the prescribed music. In addition, it is possible to display the aforementioned message on the screen of the display 9. Incidentally, the sound information (or sound data) representing the music and announcement, and the character information representing the message are stored in the message memory 16.

In step S18, a decision is made as to whether or not the user operates the portable telephone to issue an end instruction. If 'YES', the flow proceeds to step S19. If 'NO', the flow returns to step S16.

In step S19, the portable telephone stops producing the music and announcement. Then, the flow returns to the start of this process.

Next, a religious service time search process (corresponding to step S9 shown in FIG. 6) will be described with reference to FIG. 7. Normally, religious service times in Islam are determined based on sunrise and sunset times; therefore, even in the same country, religious service times differ depending on the position and time as well as the date and year. For this reason, the present embodiment employs special processing for accurately designating religious service times throughout the year, regardless of the position.

In step S20, the portable telephone detects the date and year as well as the present position thereof. That is, the present position is detected based on the position information from the GPS receiver 12, while the date and year are specified by the time counted by system clock based on calendar data (or date information) stored in the ROM 4. Then, the flow proceeds to step S21.

In step S21, the CPU 1 designates the religious service time table, which is stored in the RAM 3. Specifically, the religious service timetable contains numerous tables with regard to specific positions and dates, so that one of these tables is appropriately selected and read out in response to the position information from the GPS receiver 12 and the date information of the calendar data. Suppose that the present position is Tokyo, and the date (day) is Jul. 1, 2001 (Monday), the CPU 1 automatically designates the following table describing five religious service times in Tokyo.

Religious Service Timetable (Tokyo)

load contents of religious service time tables regarding various countries from a specific server. That is, upon definition of the present position and date on the portable telephone, the user accesses the server via networks to download the content of the corresponding religious service timetable. Herein, download data can be collected by units of days respectively, by units of months respectively, or by units of years respectively.

In step S22, a decision is made as to whether or not a date is changed. This process is required to specify the referenced portion of the religious service timetable. If the date is not changed, the CPU 1 can make a reference to the prescribed religious service timetable. However, if the date is changed, it is necessary to update the old religious service timetable with new one. If 'YES' indicating a change of the date, the flow proceeds to step S23. If 'NO', the flow proceeds to step S24.

In step S23, the CPU 1 updates the old religious service timetable with a new one in correspondence with the changed date.

In step S24, a decision is made as to whether or not the position is changed. Specifically, a decision is made as to whether or not the position information, which is obtained from the GPS receiver 12 and is stored in the RAM 3, is varied by a prescribed value regarding the latitude and longitude. This process is required when the user travels to another regional position and holds religious services at the correct time. If 'YES', the flow proceeds to step S25. If 'NO', the flow proceeds to step S26. In step S25, the CPU 1 changes the religious service timetable with an appropriate table which is suited to the regional position where the user is presently located. Then, the flow proceeds to step S26.

In step S26, the CPU 1 loads the next religious service time from the religious service timetable in response to the system clock.

When it comes to the religious service time described in the religious service timetable (see aforementioned table),

| DATE | DAY | DAWN SERVICE | NOON SERVICE | AFTERNOON SERVICE | SUNSET SERVICE | NIGHT SERVICE |
|---|---|---|---|---|---|---|
| Jul. 1, 2002 | Monday | 2:40 a.m. | 11:45 a.m. | 3:34 p.m. | 7:01 p.m. | 8:49 p.m. |

It is possible to provide the aforementioned religious service timetable with 'sunrise service' time data. Even if the present position of the user differs from the specific position whose religious service time is presently designated by the CPU 1, the portable telephone of the present embodiment allows the user to correct time data of the religious service timetable with ease. That is, the user inputs sunrise time data, which are read from the newspaper and the like, into the portable telephone, which in turn calculates a difference between the input sunrise time data and the sunrise time data described in the religious service time table, so that the CPU 1 automatically correct the content of the religious service timetable. Thus, the user is capable of controlling the portable telephone to calculate accurate religious service times at any position at any time.

In addition, the portable telephone can be modified in such a way that the next religious service times are automatically calculated as necessary in response to the present position and date information, so that calculation results are written to the RAM 3 at any time. Furthermore, the portable telephone can be connected with networks such as to downthe flow proceeds to step S12 following step S10 in FIG. 6, wherein the portable telephone rings the alarm sound on the speaker 6a, and it also displays the following message on the screen of the display 9.

"It is time to hold a religious service; please search for the direction of Mecca." Then, the user holds the portable telephone to turn the screen of the display 9 upright and rotatably moves it in a clockwise or counterclockwise direction. At this time, both the geomagnetic sensor 11 and GPS receiver 12 are activated in the foregoing steps S13 and S14. When the direction designated by the antenna 2a, which is normally arranged at the upper portion of the portable telephone, matches the direction of Mecca, the portable telephone automatically produces the prescribed music and/or announcement on the speaker 6a, while it also displays the following message on the screen of the display 9.

"This is the direction of Mecca." Thus, the user is able to determine that the direction designated by the upper portion of the portable telephone body T substantially matches the direction of Mecca.

As a result, the user can reliably hold a religious service accurately at the designated religious service time while holding his/her head in the direction of Mecca at the present position.

After the completion of the religious service, the user operates the key K2 of the portable telephone, so that the CPU 1 stops producing the prescribed music and/or announcement. Then, the user may wait for the next religious service time, which will be notified by the portable telephone.

As described above, the second embodiment is characterized by providing special processing using the geomagnetic sensor 11 and GPS sensor 12, wherein a decision is made as to whether or not the direction designated by the antenna 2a, which is arranged at the upper portion of the portable telephone body T, matches the direction of Mecca, and wherein when there is a match, the portable telephone automatically produces the prescribed music and/or announcement. Thus, the second embodiment allows the user to easily recognize the direction of Mecca.

In addition, the second embodiment is also characterized by providing accurate setup of religious service times, which are automatically calculated based on the present position information and azimuth information detected by the geomagnetic sensor 11 and GPS receiver 12, as well as the date information and calendar data. Hence, the user is no longer required to be aware of whether or not the time for a religious service has arrived. That is, the user is able to normally and accurately recognize religious service times, which are automatically notified by the portable telephone. Thus, the user is able to reliably hold religious services accurately at religious service times in the prescribed direction.

Next, a description will be given with respect to a Mecca direction search process, which is required to notify the user of the direction towards Mecca when the user manually operates the portable telephone of the second embodiment to set a Mecca direction notification mode.

The portable telephone of the second embodiment provides the aforementioned two modes, i.e., the telephone precedence mode and religious service precedence mode. In either one of these two modes, the user can set the Mecca direction notification mode by operating the specific key (e.g., K2 or K3).

In step S40, a decision is made as to whether or not the user operates the portable telephone to issue a Mecca direction notification request. Specifically, a decision is made as to whether or not the user operates the key K2 or K3 to set the Mecca direction notification mode. If 'NO', the flow returns to step S40 again, so that the aforementioned decision is repeatedly performed. If 'YES', the flow proceeds to step S41.

In step S41, the CPU 1 activates the geomagnetic sensor 11, output signals of which are then supplied to the calculation unit 13. Then, the flow proceeds to step S42.

In step S42, the CPU 1 activates the GPS receiver 12, output signals of which are then supplied to the calculation unit 13. Then, the flow proceeds to step S43.

In step S43, a decision is made as to whether or not the direction designated by the portable telephone matches the direction of Mecca. This process is performed under the condition where the user holds the portable telephone to turn the screen of the display 9 upright and rotatably moves it in a clockwise or counterclockwise direction, wherein a decision is made as to whether or not the direction designated by the antenna 2a of the portable telephone matches the direction of Mecca.

Of course, the user can designate any direction using the other part of the portable telephone other than the upper portion attaching the antenna 2a.

If 'YES' in step S43, that is, when the direction designated by the portable telephone substantially matches the direction of Mecca, the flow proceeds to step S44. If 'NO', that is, when the direction designated by the portable telephone does not match the direction of Mecca, the flow proceeds to step S45.

In step S44, the portable telephone produces the prescribed music and/or announcement on the speaker 6a in order to notify the user of a match with regard to the direction of Mecca. Then, the flow proceeds to step S45. For example, the portable telephone automatically produces vocalized sounds of the prescribed announcement, as follows:

"This is the direction of Mecca." Instead, it is possible to produce Koranic words together with the prescribed music. In addition, it is possible to display the aforementioned message on the screen of the display 9. All the sound information (or sound data) representing the music and announcement, and the character information representing the message are stored in the message memory 16.

In step S45, a decision is made as to whether or not an end instruction is issued. If 'YES' indicating issuance of an end instruction, the flow proceeds to step S46. If 'NO', the flow returns to step S43 again.

In step S46, the portable telephone stops producing the music and announcement. Then, the flow returns to the start of this process.

As described above, the user is able to easily set the Mecca direction notification mode by simply turning on the key K3 on the portable telephone; thus the Mecca direction notification process is automatically started. The Mecca direction notification process allows the user to search for the direction of Mecca, which can be easily detected by the portable telephone that is held and rotatably moved by the user in a clockwise or counterclockwise direction, and that automatically produces the music and/or announcement when there is a match. That is, the user can operate the portable telephone like a detector for detecting the direction of Mecca. If the user holds religious services normally at the specific regional position, the user is merely required to search for the direction of Mecca once; thereafter, the user simply waits for an alarm sound automatically produced at each religious service time. Thus, the portable telephone of this invention is very convenient and easy-to-handle for the user.

This invention is not necessarily limited to the aforementioned embodiments; hence, it is possible to provide various modifications and or design changes on portable terminals (e.g., portable telephones). For example, the first embodiment in which prescribed religious service times are stored in the ROM 4 in advance can be modified in such a way that the religious service time information pre-stored in the ROM 4 are corrected in response to the position information and date information to calculate 'accurate' religious service times. Of course, the first embodiment can be re-designed similar to the second embodiment in such a way that religious service timetables are stored in the RAM 3 and one of them is adequately designated by the CPU in response to the position information and date information. Herein, it is possible to additionally describe sunrise time information on the religious service timetable, so that when the user inputs a sunrise time, which may be read from the newspaper and the like, the religious service time table is automatically corrected in response to a difference between the input sunrise time and the present sunrise time described in the religious service timetable. Thus, the portable telephone can normally calculate accurate religious service times in response to the present position of the user.

In addition, it is possible to calculate the next religious service time at the present position of the user in response to the position information and date information at the appropriate timing, so that calculation results are stored in the RAM 3. After completion of the definition of the present time and position of the user, it is possible to download the appropriate religious service timetable via networks from the server that stores contents of religious service timetables with regard to various countries. Herein, the contents of the religious service timetables can be downloaded to the portable telephone by units of days respectively, by units of months respectively, or by units of years respectively.

The second embodiment can be modified similar to the first embodiment in such a way that an arrow 15 indicating the direction of Mecca is displayed on the screen of the display 9.

The aforementioned embodiments are designed to use the keys K2 and K3 for mode changes. Of course, the user may be able to freely select any keys of the portable telephone for use in mode changes.

The aforementioned processes and functions are not necessarily realized using the hardware configuration, but they can be realized using the software processing, which may be recorded in digital storage media such as memory cards. Hence, computer-readable media storing prescribed programs can be embraced in this invention.

As described heretofore, this invention has a variety of effects and technical features, which will be described below.

(1) A portable terminal (e.g., portable telephone) of this invention provides a position detector for detecting a present position thereof, and an azimuth detector for performing detection as to which direction the portable terminal presently designates. Based on detection results, the portable terminal calculates the direction of a prescribed place (e.g., Mecca) measured therefrom, so that the calculated direction is displayed on the screen of a display. Thus, the user of the portable terminal is able to easily and accurately acknowledge the direction of the prescribed place.

(2) When displaying the direction of the prescribed place, a prescribed message is correspondingly produced by preset vocalized sounds, which may assist the user to perform a prescribed behavior (e.g., religious service). That is, the user, especially a muslim who prays, can perform religious ceremonies without problems.

(3) Every prescribed time, the direction of the prescribed place is automatically displayed on the screen of the display while the corresponding message is automatically produced by a speaker. Therefore, even if the user holds a religious service every prescribed time, the user can normally and accurately acknowledge the direction of the prescribed place. In addition, the user is reliably notified of the prescribed time (e.g., religious service time) by the message whose vocalized sounds are produced by the speaker. The aforementioned display and vocalized message may effectively assist the user in holding a religious service at the appropriate timing. This may raise the use frequency of the portable terminal, which is improved in usability.

(4) When it comes to the religious service time, the portable terminal automatically displays the direction towards the prescribed place on the screen of the display. Hence, the user can clearly recognize the direction towards the prescribed place at each religious service time.

(5) The portable terminal can additionally provide the processing of making a decision as to whether or not the direction designated by the portable terminal body that is held and moved by the user substantially matches the direction towards the prescribed place. Then, the user is notified of a decision result to acknowledge whether or not the direction of the portable terminal body matches the direction of the prescribed place.

(6) In the above, the user is able to accurately determine the religious service time without being required to be aware of whether or not a religious service time has arrived. Therefore, the user can relax regarding holding a religious service in the direction towards the prescribed place at the accurate religious time without feeling psychological stress.

(7) The portable terminal can be set to either the telephone precedence mode or the religious service precedence mode. When the religious service precedence mode is selected by the user, the portable terminal automatically inactivates transmission and reception of signals during the prescribed time period. This reliably prevents the user from being interrupted by reception of incoming calls, which are unwelcome while the user is holding a religious service.

(8) In particular, the muslim who is praying can concentrate on religious services, which should be held every day, by using the portable terminal of this invention.

As this invention may be embodied in several forms without departing from the spirit or essential characteristics thereof, the present embodiments are therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. A portable terminal comprising:

a religious service time detection unit to determine if the present time matches a religious service time;

a first notification device to generate a first notification identifying that the present time matches the religious service time;

an azimuth detector to detect an azimuth to produce azimuth information that is automatically activated if it is determined that the present time matches the religious service time;

a position detector to detect a present position to produce position information that is automatically activated if it is determined that the present time matches the religious service time;

a direction match discriminator to determine a direction toward a prescribed place based on the azimuth information and the position information, and to determine whether a direction designated by a prescribed portion of a portable terminal body matches the direction toward the prescribed place; and a second notifying device to notify a user of a match detected between the direction designated by the prescribed portion of the portable terminal body and the determined direction toward the prescribed place.

2. The portable terminal of claim 1, further including an antenna that is attached to the prescribed portion of the portable terminal body to communicate using signals.

3. The portable terminal of claim 1, wherein the first notification, to notify that the present time matches the religious service time, is made by one of a sound reproduction device or an image display.

4. The portable terminal of claim 1, wherein the second notification, to notify that the designated direction matches the direction towards the prescribed place, is made by one of a sound reproduction device or an image display.

5. The portable terminal of claim 1, wherein determining whether the present time matches the religious service time is determined based on previous position information, which is detected in advance by the position detector and date information representing the present date.

6. The portable terminal of claim 5, further including a storage device to store a plurality of religious service time tables that are related to prescribed religious service dates and prescribed religious service time, wherein the determination of whether the present time matches the religious service time is performed utilizing the religious service time determined based on the content of a religious service time table, the religious service time table being read and selected from the plurality of religious service time tables on the basis of the previous position information, which is detected in advance, and the date information representing the present date.

7. A method of utilizing a portable terminal, comprising:

determining if a present time matches a religious service time;

generating a first notification identifying that the present time matches the religious service time;

detecting an azimuth to produce azimuth information by automatically activating a azimuth detector if it is determined that the present time matches the religious service time;

detecting a present position to produce position information by automatically activating a position detector if it is determined that the present time matches the religious service time;

determining a direction toward a prescribed place based on the azimuth information and the position information;

determining whether a direction designated by a prescribed portion of a portable terminal body matches the determined direction toward the prescribed place; and notifying a user of a match detected between the direction designated by the prescribed portion of the portable terminal body matches the determined direction toward the prescribed place.

8. A computer-readable medium encoded with computer-readable instructions, said computer-readable instructions, which when executed cause a portable terminal to:

determine if a present time matches a religious service time;

generate a first notification identifying that the present time matches the religious service time;

detect an azimuth to produce azimuth information by automatically activating a azimuth detector if it is determined that the present time matches the religious service time;

detect a present position to produce position information by automatically activating a position detector if it is determined that the present time matches the religious service time;

determine a direction toward a prescribed place based on the azimuth information and the position information;

determine whether a direction designated by a prescribed portion of a portable terminal body matches the determined direction toward the prescribed place; and notify a user of a match detected between the direction designated by the prescribed portion of the portable terminal body matches the determined direction toward the prescribed place.

* * * * *